March 3, 1953 V. CRONSTEDT 2,629,936
METHOD AND APPARATUS TO ESTABLISH LOCATING
POINTS ON WORKPIECES
Filed Sept. 19, 1947 4 Sheets-Sheet 1
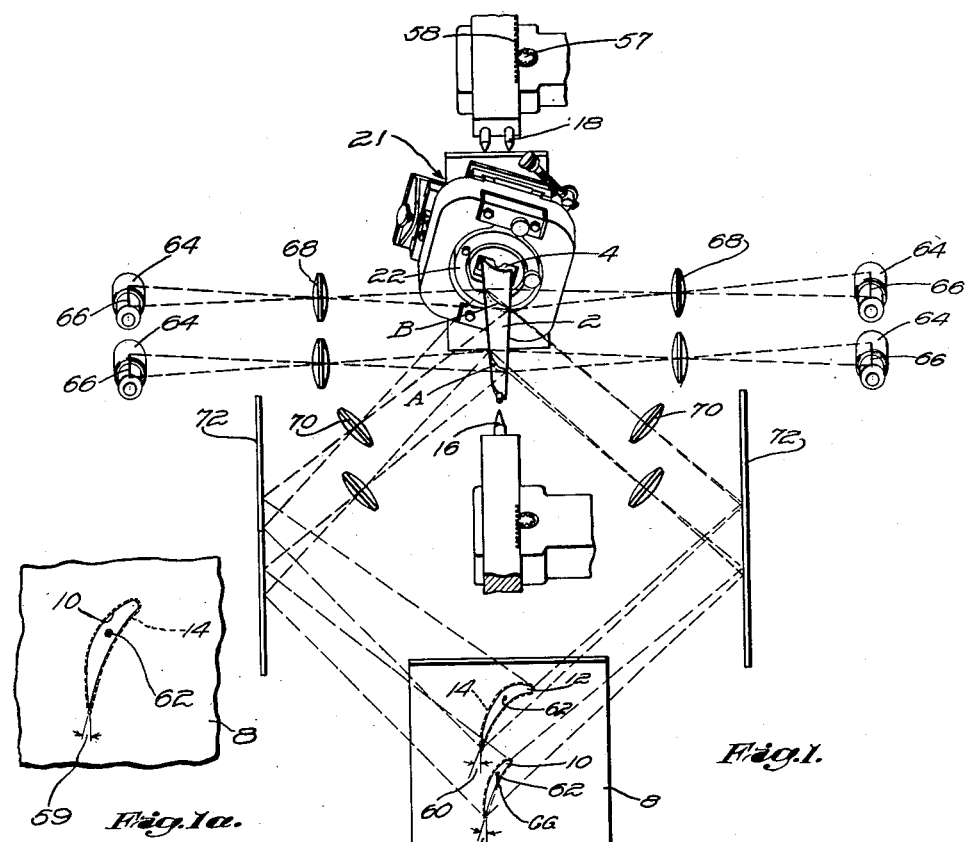
Fig.1.
Fig.1a.
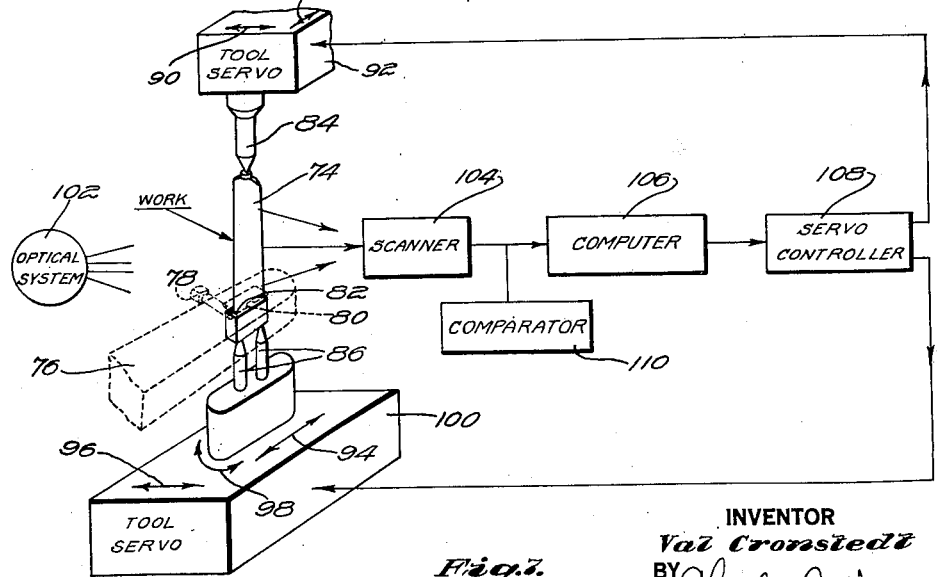
Fig.7.
INVENTOR
Val Cronstedt
BY Charles A. Warren
ATTORNEY March 3, 1953
V. CRONSTEDT
2,629,936
METHOD AND APPARATUS TO ESTABLISH LOCATING POINTS ON WORKPIECES
Filed Sept. 19, 1947
4 Sheets-Sheet 2
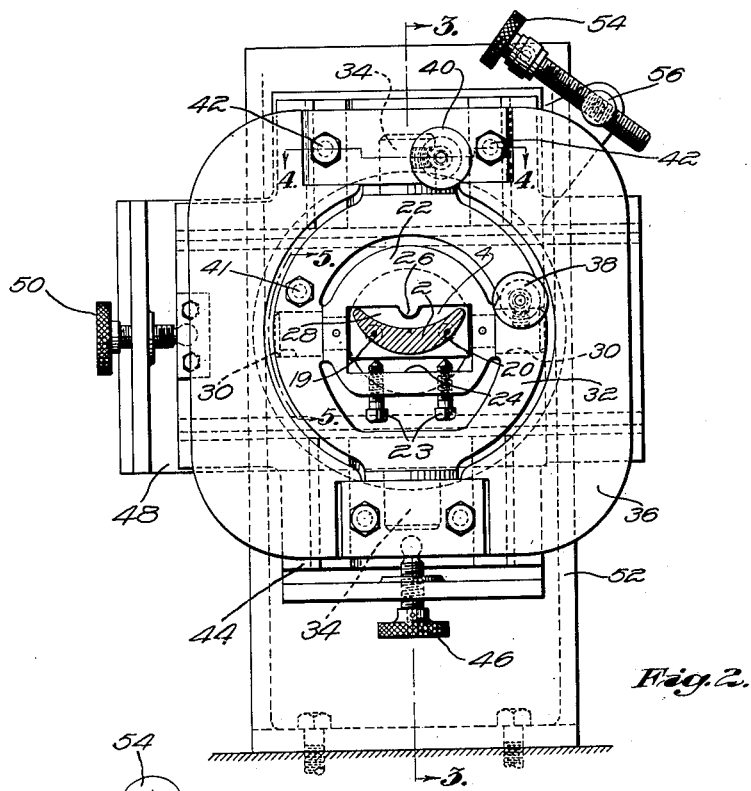
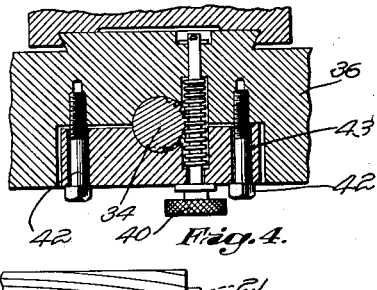
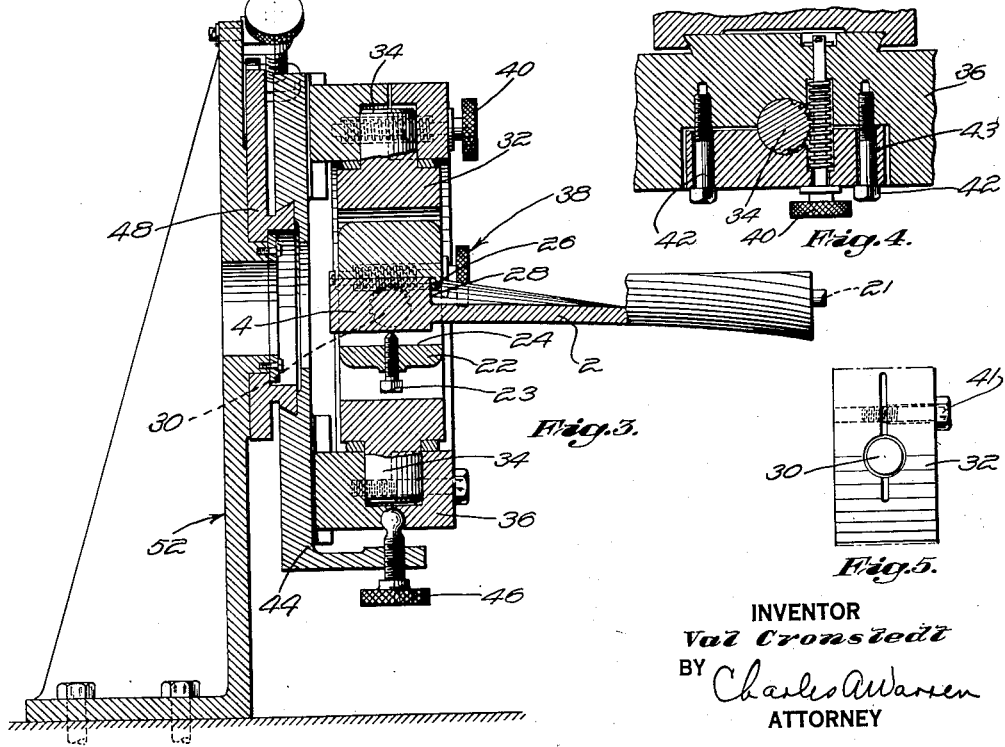
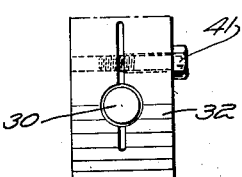
INVENTOR
Val Cronstedt
BY Charles A. Warren
ATTORNEY

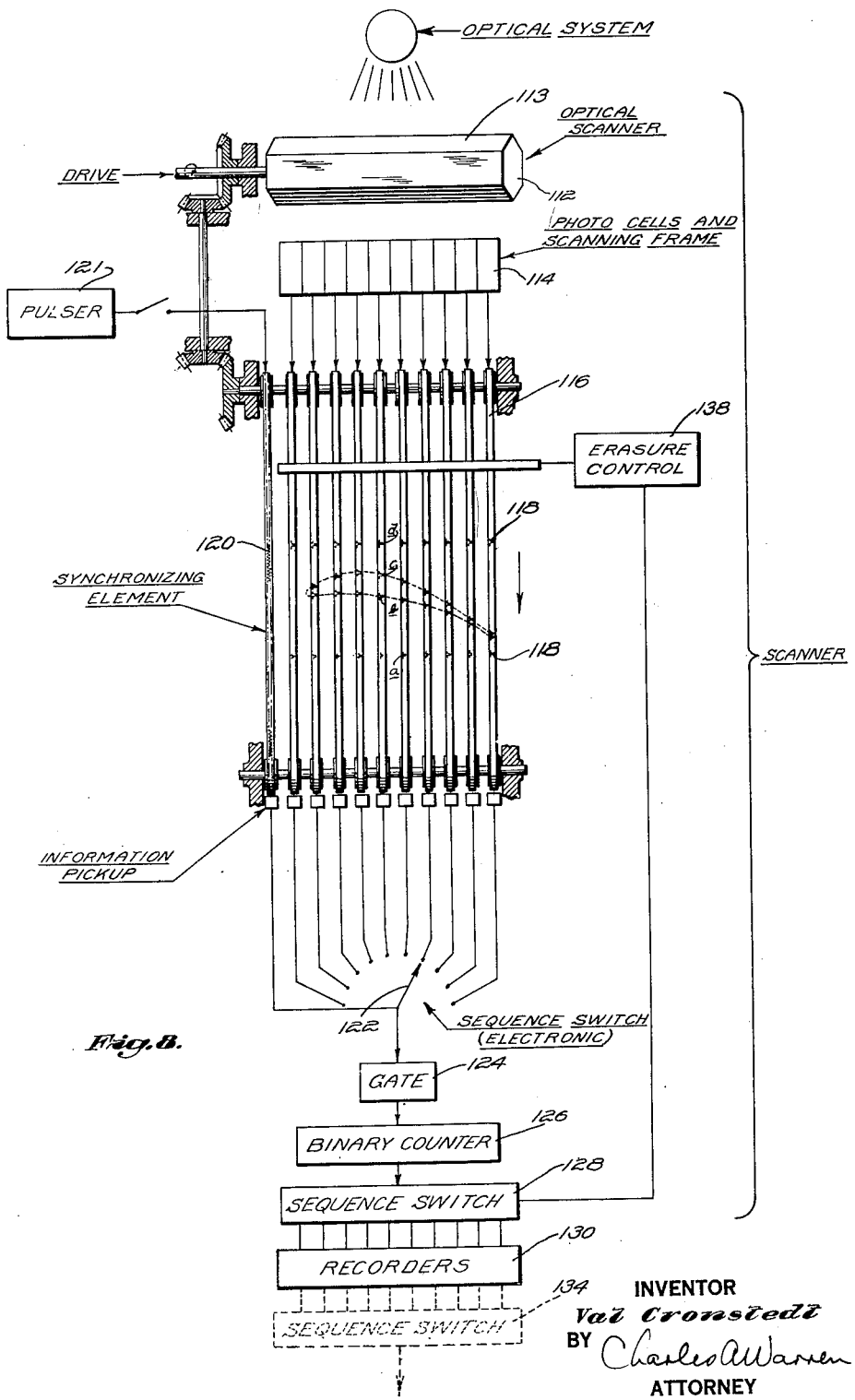

Patented Mar. 3, 1953

2,629,936

UNITED STATES PATENT OFFICE 2,629,936

METHOD AND APPARATUS TO ESTABLISH LOCATING POINTS ON WORKPIECES

Val Cronstedt, Malborough, Conn., assignor to United Aircraft Corporation, East Hartford, Conn., a corporation of Delaware Application September 19, 1947, Serial No. 775,006

21 Claims. (Cl. 33—174)

This invention relates to the inspection of pieces of work and to the marking thereon of location points by which the piece of work may be accurately positioned for subsequent machining. The invention is particularly useful in the inspection of blades and vanes for use, for example, in turbines or axial flow compressors and in providing locating points or surfaces on the blade or vane with those surfaces or points in predetermined relation to the contours of the effective blade or vane surfaces.

In turbines and axial flow compressors, the blade and vane contours are critical if the device is to operate at a high speed with adequate strength and efficiency, and it becomes necessary to locate adjoining vanes or blades with their effective surfaces accurately positioned with respect to one another and with respect to the axes of the device or with respect to fixed planes of reference. With rotating elements such as a compressor or turbine rotor, it is also essential that the central longitudinal neutral axis of each blade, that is to say, the line passing through the centers of gravity of parallel cross-sectional areas, must be accurately located with respect to definite planes of reference.

The accurate positioning of the blades on the rotating elements is dependent upon the accurate machining of the blade roots, so that the blade sections will be properly located when assembled on the periphery of a turbine or compressor hub. This is accomplished by having the operative surfaces of the blade accurately located with respect to the finished surfaces of the blade roots. In the stationary vanes the accurate positioning of the vanes is dependent upon the location of the finished surfaces of the end flanges provided on the vanes which engage other parts of the machine. These flanges control the spacing of the vanes and also the angle of the trailing edges of vanes with respect to the axis of the device. A feature of this invention is the accurate location at spaced points on the piece of work, which may be, for example, a blade or vane, of positioning surfaces by which the piece of work will subsequently be accurately located in machining fixtures.

Where the critical contours of the work pieces are so irregular that conventional inspection methods are not adapted for rapid, precise inspection or where the work piece is of such a character that conventional gaging devices cannot be applied, as for example, in a turbine or compressor blade having a high twist between its ends, it is advantageous to obtain for the purpose of inspection, an accurate reproduction of the contour of the work piece at longitudinally spaced points. A feature of the invention is an optical system by which to project at any desired magnification a complete and exact image of the actual contour of the work. Another feature of the invention is the use of this projected image accurately to position the tools with respect to the work piece for the formation of the locating surfaces. A feature is an arrangement by which to adjust the relative position of the piece of work and the tools in comparison with an established standard so that the locating marks when placed on the work pieces will be in predetermined relation to the contour of the work or, in the case of vanes or blades, in predetermined relation to the trailing angle of the vanes and in predetermined relation to the neutral axis or the effective surfaces of the blade or vane.

The inspection of the pieces of work, including the comparison of the projected contour or contours with standard contours and the subsequent adjustment of the relative positions of tools and the work piece in readiness for the formation of the positioning surfaces, may be carried out manually or by an automatic operation. A feature of the present invention is an arrangement for performing the complete inspection and location marking automatically and at a rapid rate thereby minimizing the time involved.

Other objects and advantages will be apparent from the specification and claims, and from the accompanying drawing which illustrates an embodiment of the invention.

In the drawing,

Fig. 1 is a diagrammatic view of an apparatus including the optical system by which the operation may be carried out.

Fig. 1a is an enlarged view of one of the images on the screen.

Fig. 2 is a plan of the work piece holder of Fig. 1.

Fig. 3 is a sectional view on line 3—3 of Fig. 2.

Fig. 4 is a sectional view on line 4—4 of Fig. 2.

Fig. 5 is a sectional view on line 5—5 of Fig. 2.

Fig. 6 is a diagrammatic view showing the planes in which the blade must be moved for accurate location on a rotor.

Fig. 7 is a diagrammatic view of the automatic machine for carrying out the invention.

Figs. 8 and 8a are a block diagram showing in greater detail a part of the device of Fig. 7.

Figures 6, 8A:
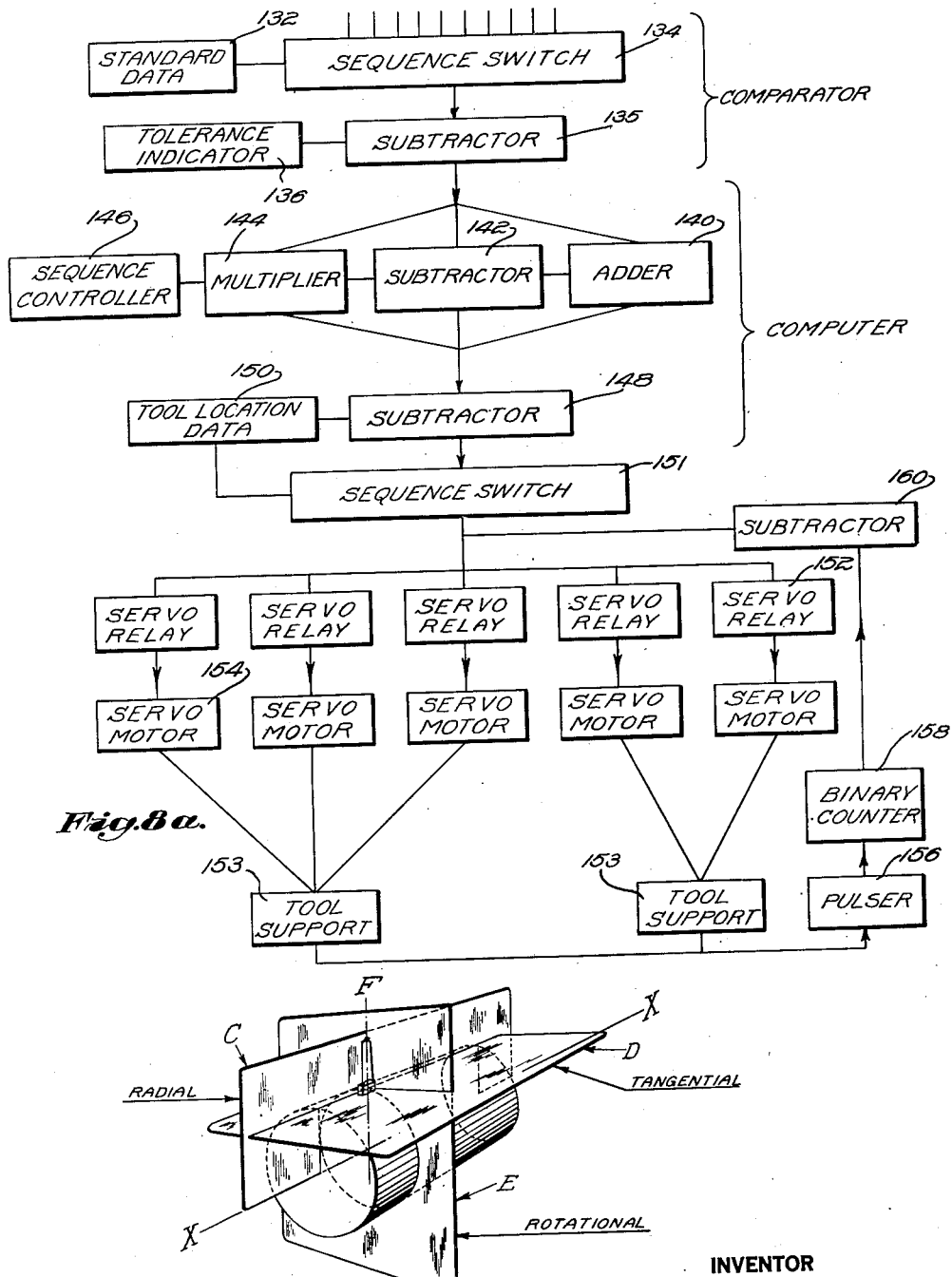

The invention is shown in connection with the operation on a turbine blade 2 which has a root 4 at one end of the effective portion of the blade. As each blade has a complicated shape and a substantial twist between its ends, the problem of inspection by conventional gauging methods is made difficult.

The device of Fig. 1 provides for projecting on a screen 8 the contours of the blade at a number of longitudinally (radially) spaced points as at the stations marked A and B. The optical system is such that all sides of the blade may be projected in proper relation to each other. The projected image 10, for section A, or image 12, for section B, will have a predetermined magnification. The screen 8, for the purpose of work piece inspection, may carry, as shown in dotted lines 14, the limits between which the projected images of the work piece must be located if the blade surfaces are within the required limits. When the images 10 and 12 are properly located within the limits established by the lines 14, the work piece is also properly located with respect to the fixed tools 16 and 18 so that the tools may be fed against the work piece to produce the three spaced locating points 19 and 20, Fig. 2, and 21, Fig. 3, by which the work piece may subsequently be accurately positioned in fixtures for machining the root 4.

It will be understood that the invention is primarily applicable to forged or cast blades or vanes, in which the operative surfaces of the blade or vane are finished to the desired dimension in the casting or forging operation. If the entire blade surface is machined, the locating points may be provided during the machining of the operative blade surfaces.

To adjust the position of the work piece with respect to the tools, it is necessary to provide for motion either of the tools or the work piece with respect to each other. In the arrangement shown, since the required limits are in fixed position on the screen 8, it is advantageous to have the tools 16 and 18 fixed and to move the work piece with respect to the tool. To accomplish this, the work piece is supported in a fixture 21 which may be adjusted until the desired location of the work piece is obtained. As shown in Fig. 2 the fixture 21 includes a holder 22 which is adapted for clamping the work piece by the root 4 and to this end may have set screws 23 which clamp the root of the blade within a recess 24 in the fixture. The work piece may be located longitudinally (radially) by a projecting finger 26 on the fixture which extends over and engages a substantially flat surface 28 forming a part of the surface of the blade root from which the blade extends.

The holder 22 may be mounted on trunnions 30 in a supporting ring 32 which in turn may be mounted on trunnions 34, on a slide 36.

The image of one section of the blade with respect to the other may be shifted vertically on the screen by motion of the holder 22 which may be accomplished by a suitable means, as by a thumb screw 38 engaging a toothed section of one of the trunnions 30. The position of one image with respect to the other may be shifted horizontally on the screen by motion of the supporting ring 32 on its trunnions. The ring 32 may be adjusted with respect to the slide 36 as by a thumb screw 40 engaging a toothed section of one of the trunnions 34. When fixture 22 has been properly adjusted, it may be locked by tightening bolt 41 which clamps a split section of ring 32, see Fig. 5, around one of the trunnions 30. Similarly, ring 32, when properly adjusted, is clamped in slide 36 by tightening bolts 42, thereby tightening a cap 43 against one of the trunnions 34.

The slide 36 carrying the supporting holds 22 and ring 32 may be mounted on a supporting slide 44 and is moved rectilinearly with respect to the supporting slide as by a thumb screw 46, Fig. 3. Slide 44 is mounted on guides on a turntable 48 and is moved rectilinearly with respect to the turntable as by a thumb screw 50. The turntable is supported as by a bracket 52. The angular position of the blade about its longitudinal axis may be adjusted by turning the turntable 48, as by a thumb screw 54 in a projecting lug 56 on the turntable. It will be understood that under normal circumstances only a comparatively small motion of the blade being inspected will be required for the necessary adjustment of the projected images. Although a simplified thumb screw adjustment for each of the several slides is shown, it will be apparent that an electric or hydraulic drive for each motion would be desirable.

Motion of the slide 36 has the effect of shifting both projected images vertically of the screen. The motion of the slide 44 has the effect of shifting both the projected images simultaneously in a horizontal direction on the screen. The bracket 52 is obviously mounted on the same supporting structure that carries the tools 16 and 18 for maintaining a predetermined relation between the work supporting structure and the tools. It will be noted that, with the projected images falling within the limits prescribed by the lines 14, the centers of gravity of the projected images will be located within the tolerance covered by the mark 62 which defines the limits within which the center of gravity of each cross-section would be located.

The tools may be arranged to be fed axially into engagement with the work by any well-known type of feed as is common in drill presses and may include a pinion 57 engaging with a rack 58 on the slide which carries the tool or tools. The tools are shown as prick punches, although center drills might well be substituted. It will be understood that the work supporting structure is so arranged that the tools 18 may have access to the bottom surface of the blade root, as shown in Fig. 3.

With the work piece so supported that it has the several movements above outlined with respect to the tools, it is possible to adjust the work piece until both images 10 and 12 are located within the limits established by the standard indications 14 on the screen. When this has been accomplished, the tools may be moved axially into engagement with the work piece and will mark the work piece with three points or surfaces having a predetermined location to the blade contours, the trailing edge of the blade (for each section there is a predetermined angle 59 or 60 which the trailing edge of the blade should make with a predetermined plane which may correspond to a plane including the axis of the rotor).

With reference to Fig. 6, the above described adjustments of the blade are arranged so as to orient it that, when finished, its neutral axis as represented by line F and trailing edge will have a predetermined relation to the axis of the rotor as represented by the line X—X. To accomplish this, the blade must be accurately located with reference to the radial plane C, the tangential plane D, and the rotational plane E. The angular relation of the trailing edge to the rotor axis (adjustment about line F) is provided by the adjustment of turntable 48. The position of the blade in the radial plane C is adjusted by movement of the supporting ring 32 on its trunnions. The position of the blade in plane D is adjusted by movement of the two slides 36 and 44, and in plane E is adjusted by moving holder 22. The distance of the blade from the axis is controlled by the projecting finger 26.

The optical system by which each selected blade contour may be projected on the screen may include, as shown in Fig. 1, a pair of light sources 64 located at opposite sides of the blade. These light sources may have straight line filaments 66, the images of which are projected by lens systems 68 on to the surfaces of the blade at a predetermined position as, for example, position A or position B. With a straight line filament, the image of the filament lies in a plane at the predetermined longitudinal (radial) position on the blade and the reflection from this image may be projected through another lens system 70 to a mirror 72 which reflects the image in focus to the screen 8. It will be understood that the lens system 70 may be so arranged as to give the desired magnification of the image on the screen 8. By the use of two systems, it is generally possible to cover the entire perimeter of the work piece so that the complete contour may be projected on the screen. It will be apparent that under certain circumstances three or more light sources and associated lens systems have to be utilized for the purpose of assuring projection of the complete outline of the contour of the work piece. Such an arrangement may be necessary where the contour to be projected is more irregular than that of the blade shown in the drawings.

The particular arrangement of optical systems shown projects the two images on the screen in predetermined relation to each other so that the resulting image is an accurate representation of the contour of the blade at the selected position on the blade and at the desired magnification as determined by the lens systems.

Where the number of work pieces requiring operations is such that the manual manipulation of the device above described would require too much time, it may be advantageous to make the entire machine automatic. This may be done as shown, for example, in Fig. 7, in which the work piece 74 is supported in a fixed bracket 76 which clamps the blade root as by one or more set screws 78 and which positions the blade radially by a projecting finger 80 engaging with the end surface 82 on the blade root. Instead of moving the work piece for adjusting its position with reference to the tools 84 and 86 which may be in the form of center drills, the tools are moved with respect to the work. Thus the tool 84 engaging with the tip of the blade is supported by guides which permit the tool to move in two directions at right angles to each other and in a plane substantially at right angles to the radial axis of the blade as indicated by the arrows 88 and 90 on the tool servo mechanism 92 hereinafter more fully described. Obviously the drill 84 is moved along its axis into contact with the work piece by any well-known mechanism, as, for example, the mechanism shown in Fig. 1.

The two spaced tools 86 are supported by guides which permit the tools to move in two directions at right angles to each other in a plane substantially perpendicular to the radial axis of the blade as indicated by the arrows 94 and 96, these directions being parallel to the directions of motion of the tool 84. The tools 86 are also guided in such a manner that they are adapted to be turned axially about an axis substantially parallel to the radial axis of the work as indicated by the arrow 98 to adjust the angle of the plane of the tools with respect to the trailing edge angle of the blade. These motions are accomplished by a tool servo mechanism 100 hereinafter described in greater detail.

The optical system 102, which is similar to that of Fig. 1, is shown diagrammatically in Fig. 7 and is adapted to project images of the cross-sectional contours of the blade in the same manner as shown in Fig. 1. Instead of projecting the blade contours on a visual screen 8 as in Fig. 1, the blade contours are projected on to the receiving screen or element of an automatic scanning device 104 which will scan each image projected and translate the image into electric or magnetic impulses which may be utilized by an electrical computer 106 in determining the cross-sectional area of each projected blade section, the location of the center of gravity of each projected blade section, and the angle that the trailing edge makes with a predetermined reference plane.

The computer 106 transmits that information, or a modification of that information to represent the amount of movement required by the tools, through a servo controller 108 to the tool servos 92 and 100 to position the tools in a predetermined relation to the neutral axis of the work as determined by the centers of gravity of the scanned images. The tools 86 are also moved into predetermined relation to a plane making the required angle with the trailing edge at the scanned section. The information obtained by the scanner may also be compared electrically with standard data in a comparator 110 which will thereby indicate whether the work piece is within the required limits of shape.

The electrical arrangement by which the information provided by the scanner is used in the comparator and in the computer is well known as is also the mechanism by which the necessary data is computed and transmitted to the servo controller for adjusting the tools with respect to the effective blade surfaces. The mechanism for this device may be similar to that developed for controlling the direction and time of firing of guns especially of the anti-aircraft type or of the type used on battleships in which the gun is held on the target regardless of the motion of the target or the ship as a result of the intelligence received by "radar." A similar computing mechanism and servo controller has been used in the control of guided missiles which control the flight of the missile by automatically adjusting servo mechanism from a computer which bases the change necessary for the rudder position on the amount that the missile is moved off course during its flight. Such corrections are also necessarily automatically computed as a result of the change in the location of the center of gravity of the missile by consumption of fuel. These mechanisms are discussed in detail in "Principles of Radar" by the Massachusetts Institute of Technology Radar School Staff (second edition).

Any satisfactory arrangement by which the projected image is scanned and the center of gravity computed may be used. One arrangement, for example, of the scanning and computing system is shown in Figs. 8 and 8a from which it will be apparent that the image, which is shown in Fig. 7 as being projected into the scanner, may be projected (instead of on the screen 8, Fig. 1) onto an optical scanner 112 which may consist of a flat mirror 113 which, upon rotation, sweeps the image past a bank of photocells 114 which are activated by the image as it is swept past the bank. The impulses from the photocells may be recorded, for example, on magnetic recording tape or tapes 116. These tapes are of well-known construction; the information recorded is represented schematically on the tapes by the offsets 118 which, in the actual construction, are not visible on the tape but consist of magnetic changes in the arrangement of the molecules in the tape itself.

Associated with the several magnetic tapes 116 for the photocells is a synchronizing or standard tape 120 moving with the other tapes. On this tape at regular intervals are pulses which correspond to units in the height of the selected scanning frame. These may be placed on the synchronizing tape by a pulser 121. The projected blade image is represented schematically in dotted lines on the tapes from which it will appear that the data recorded on the tapes corresponds to the exact pattern of the blade shape.

It will be understood that the pulses recorded on the standard tape are of such a frequency that they represent the desired precision of measurement for the contour. For example, if the height of the scanning frame is two inches, and the measurements required must be on the order of .0001 inch, the standard tape must store 20,000 pulses on the part of the tape representing the height of the scanning frame. The individual tapes will store pulses representing the points $a$, $b$, $c$, and $d$.

It will be understood that the data recorded on any one of the tapes 116 and on the standard tape 120 may be fed to an electronic counter which will thereby indicate the height of the points $b$, $c$, and $d$, above the base line $a$ in the form of a binary number. As shown in Fig. 8, the sequence switch 122, of conventional construction, operates to supply the data from each of the tapes 116 successively and from the standard tape 120 through an electronic gate 124 to one or more electronic counters 126, thereby providing a record of the height of the image points for each tape.

The counter 126 may be of any well-known construction, as, for example, a binary counter of one of the types described in "Electrical Counting" by W. B. Lewis. The data given by the binary counter is in the form of binary numbers which cannot be used directly for comparison with dimensions in the decimal system but which require conversion. Nevertheless, the binary information or data is readily used in the electronic computer since the necessary computations for obtaining the centers of gravity of the projected images and the angle of the trailing edge to the reference plane, can be most easily carried out in the binary system. The projected area, for example, may be computed by the well-known formula:

$$A = w/3 [y_0 + y_n) + 4(y_1 + y_3 + y_5 \ldots + y_{n-1}) + 2(y_2 + y_4 + y_6 \ldots + y_{n-2})].$$

This formula is particularly adapted for the binary system since multiplying by 4 adds two zeros to the multiplicand and multiplying by 2 adds one zero to the multiplicand. By arbitrarily assigning $w$, the width of each scanned interval, equal to 3, the entire process is one of addition and the true value of $w$ can then be substituted by calibration.

From the binary counter 126 the information provided by the counter, which, as above stated, is the height of the image point or points above a base line, is delivered through another sequence switch 128 to a series of recorders 130 in which the information provided by the counter is stored in binary form.

The recorders 130 may be of any suitable type. Magnetic recorders are advantageous since they are rapid, compact, and of high capacity, and can store the data supplied by the binary counter in a form that can be delivered to the computer and utilized directly therein. In any event, it is desirous that the recorders retain the data in a form which can be utilized readily and that the recorded data be readily erased or removed after the completion of the operation of the apparatus, in readiness for the operation on the succeeding blade.

From these recorders 130, the data may be compared with standard data in a standard data reference recorder 132 through an additional sequence switch 134 to determine whether the projected blade image is within the required limits of size and dimension. It will be understood that the standard data will be in a binary form similar to that of the data in the recorders 130. After the comparison of the data from the work piece being inspected with the standard data, the amount of variation between the recorded data (from each recorder 130) and the standard data (from recorder 132) may be determined by a subtractor 135 of usual construction. The variations in dimension are supplied to an indicator 136 by which to determine whether the work piece is within the required limits.

When the binary counters have utilized the information from each of the tapes 116 and the data is all stored in the recorders 130, the sequence switch 128 may actuate an eraser control 138 by which to remove the indications from the tapes in readiness for scanning the next work piece.

The stored information from recorders 130 is then delivered through the same sequence switch 134 (this switch also causes to be compared the record data with standard data) to the registration computer 106 also preferably operating on the binary system and which may, for example, consist of an adder 140, a subtractor 142, and a multiplier 144 (division being accomplished by iteration). The operation of the elements of the computer is under the control of a sequence controller 146. The arrangement is such that the coordinates of the centers of gravity of the projected blade sections with respect to the reference planes is computed, as is also the area of the projected image.

It may be advantageous to compute the area and center of gravity of the entire scanning frame and also to compute the area and center of gravity of the frame with the blade area removed. Then by subtractive processes, the area and required coordinates of the center of gravity of the blade may be obtained. The angle of the trailing edge is also computed by the computer. For example, the coordinates of a number of points on the contour near the trailing edge are sufficient to indicate the slope, or the angle made by these points with the reference planes, thereby determining the required angle with respect to which the tools must be rotated.

After the location of the coordinates of the centers of gravity are known, the information may be compared through a subtractor 148 with tool location data 150 giving the location of the centers of gravity of the standard sections, that is, the mean location of the tools, thereby indicating the amount that the tools must be moved and also the direction of movement of the tools to place them in the required position for making the work piece. With the error or amount of tool movement known, the servo-unbalance signal representing this error is transmitted through a sequence switch 151 to the servo relays 152. The separate tool supports 153 are moved in the several directions, as indicated in Fig. 7, by the servomotors 154. Associated with the servomotors or tool supports is a pulser 156 which indicates the amount of movement imparted to each tool supported by the servomotors. The indicated movement is then changed to a binary number by a counter 158 and thence through a subtractor 160 to the servo relays so that when each support has been moved the required amount in each of its directions of motion, the error indications to the servo relays will have been canceled out. The tools will then be in the proper position for the tools to mark the tip and root of the blade. The tools may be caused to move into engagement with the blade electrically, hydraulically, or manually to apply the marks. As a final part of the cycle the tool servos are operated from the tool location data 150 to bring them back to the theoretically correct mean position.

The electrical circuits and structures indicated by the blocks shown diagrammatically in Fig. 8 are well known in the electronics field and may readily be assembled to produce the result desired in the complete system.

It is to be understood that the invention is not limited to the specific embodiment herein illustrated and described, but may be used in other ways without departure from its spirit as defined by the following claims.

I claim:

1. In the marking of work pieces, the steps which involve projecting the cross-sectional contour of the work piece at longitudinally spaced points, determining the location of the centers of gravity of the projected contours and marking the work pieces with locating points having a predetermined relation to a line passing through the centers of gravity of said contours.

2. In the formation of locating points on work pieces, the steps which involve projecting the cross-sectional contours of the work pieces at longitudinally spaced points, adjusting the relative positions of the work pieces and a plurality of marking tools until the tools have a predetermined relation to the work piece as determined by the projected contours, and marking the work piece with locating points having predetermined relation to a line passing through the centers of gravity of said contours.

3. In the formation of locating points on work pieces, the steps which involve projecting the cross-sectional contours of the work piece at longitudinally spaced points, determining the location of the centers of gravity of the projected contours, adjusting the relative positions of the work pieces and a plurality of marking tools until the tools have a predetermined relation to a line including the centers of gravity of the projected contours of the work piece and marking the work piece with said tools such that the marks produced have a predetermined relation to the centers of gravity of said contours.

4. In the formation of locating points on work pieces, the steps which involve projecting the cross-sectional contour of the work piece at longitudinally spaced points, determining the location of the centers of gravity of the projected contours and also the angular relation of the work piece with respect to a reference plane parallel to a line including the centers of gravity, and marking the work piece with locating points having a predetermined relation to the line including the centers of gravity and also a predetermined relation to the angular position of the work piece.

5. In the formation of locating points on work pieces, the steps which involve projecting the cross-sectional contour of the work piece at longitudinally spaced points, determining the location of the centers of gravity of the projected contours and also the angular relation of the work piece with respect to a reference plane parallel to a line including the centers of gravity, adjusting the relative positions of the work piece and a plurality of marking tools until the tools have a predetermined relation to the line passing through the centers of gravity and also a predetermined relation to the angular position of the work piece, and marking the work piece with said tools.

6. In the formation of locating points on a compressor or turbine blade having a root thereon, the steps which involve supporting said blade by said root, projecting the cross-sectional contours of the blade at radially spaced points on the operative portion of the blade, adjusting the relative position of the blade and a plurality of marking tools until the tools have a predetermined relation to the operative portion of the blade as determined by the projected contours and marking the blade by said tools.

7. In the formation of locating points on a compressor or turbine blade having a root thereon, the steps which involve supporting said blade by said root, projecting the cross-sectional contours of the blade at radially spaced points along the operative portion of the blade, adjusting the relative position of the blade and a plurality of marking tools until the tools have a predetermined relation to the operative portion of the blade as determined by the projected contours and to the trailing edge thereof, and marking the blade by said tools.

8. In an inspection and machining device for a work piece, means for supporting the work piece, means for projecting a plurality of longitudinally spaced cross-sectional contours of the work piece, a plurality of marking tools, means for supporting said tools in operative relation to the work piece, and means for adjusting the piece with respect to the plurality of tools by reference to the projected images for accurately locating the tools with respect to the work piece including means for moving one of said supporting means in two directions substantially at right angles to each other in a plane substantially parallel to the plane of the cross-sectional contours.

9. In a device of the class described, means for supporting a work piece, means for supporting a plurality of tools in operative relation to the work piece, means for projecting a plurality of longitudinally spaced cross-sectional contours of the work piece at spaced points, and means for moving one of said supporting means relative to the other to position the tools in predetermined relation to the contours of the work piece as determined by the projected images, said positioning motion including motion in two directions substantially at right angles to each other in a plane substantially parallel to the plane of the cross-sectional contours.

10. In a device of the class described, means for supporting a work piece, means for supporting a plurality of tools in operative relation to the work piece, means for projecting a plurality of longitudinally spaced cross-sectional contours of the work piece at spaced points, means for moving one of said supporting means relative to the other to position the tools in predetermined relation to the contours of the work piece as determined by the projected images, said positioning motion including motion in two directions substantially at right angles to each other in a plane substantially parallel to the plane of the cross-sectional contours, and means for moving the tools into engagement with the work piece when the tools and work piece are in predetermined relation.

11. In a device of the class described, means for supporting a work piece, means for supporting a plurality of tools in operative relation to the work piece, means for projecting a plurality of longitudinally spaced cross-sectional contours of the work piece, one of said supporting means having a fixed relation to the projecting means, and means for moving the other of said supporting means for positioning the tools in predetermined relation to the contours of the work piece as determined by the projected images, said positioning motion including motion in two directions substantially at right angles to each other in a plane substantially parallel to the plane of the cross-sectional contours and also angular motion about an axis substantially at right angles to the cross-sectional contours.

12. In a device of the class described, means for supporting a work piece, means for supporting a plurality of tools in operative relation to the work piece, means for projecting a plurality of longitudinally spaced cross-sectional contours of the work piece, means for determining the location of the centers of gravity of the projected contour, one of said supporting means having a fixed relation to the projecting means, and means for moving the other supporting means to position the tools in predetermined relation to the contours of the work piece as determined by the centers of gravity of the projected contours, said positioning motion including motion in two directions substantially at right angles to each other in a plane substantially parallel to the plane of the cross-sectional contours and also angular motion about an axis substantially at right angles to the cross-sectional contours.

13. In a device of the class described, means for supporting a work piece, means for supporting a plurality of tools in operative relation to the work piece, said tools including a pair of tools movable as a unit and spaced apart from each other, and a separate tool spaced from the pair of tools, said three tools being arranged to provide three spaced locating points on the work piece, means for projecting a plurality of longitudinally spaced cross-sectional contours of the work piece, and means for moving one of said supporting means relative to the other for positioning the tools in predetermined relation to the contours of the work piece as determined by the projected images, including means for moving one of said supporting means angularly about an axis substantially at right angles to the cross-sectional contours for adjusting the relative angular position of the pair of tools and the work piece, and also including means for moving one of said supporting means linearly in two directions substantially parallel to the contours and substantially at right angles with respect to each other, and means for moving the tools into engagement with the work piece when the tools and work piece are in the predetermined relation.

14. In a device for forming locating points on a compressor or turbine blade having a root section and an operative blade section, means for supporting the blade, means for supporting a plurality of tools in operative relation to the blade, means for projecting a plurality of longitudinally spaced cross-sectional contours of the blade, and means for moving one of said supporting means relative to the other to position the tools in predetermined relation to the contours of the work piece as determined by the projected images, said moving means including means for moving one of said supporting means in two directions substantially at right angles to each other in a plane substantially parallel to the plane of the cross-sectional contours, the other of said supporting means having a fixed relation to the image projecting means.

15. In a device for forming locating points on a compressor or turbine blade having a root section and an operative blade section, means for supporting the blade, means for supporting a plurality of tools in operative relation to the blade, means for projecting a plurality of longitudinally spaced cross-sectional contours of the blade, said tools including a pair of tools spaced apart from each other in a direction substantially at right angles to the longitudinal axis of the blade, means for moving one of said supporting means relative to the other for positioning the tools in predetermined relation to the contours of the blade as determined by the projected images, said last means including means for turning said one of said supporting means angularly about an axis substantially coincident with the longitudinal axis of the blade and other means for moving one of said supporting means linearly in two directions substantially parallel to the contours and substantially at right angles with respect to each other, and means for moving the tools into contact with the blade after the tools and blade are in the predetermined relation to each other.

16. In a device for forming locating points on a compressor or turbine blade having a root section and an operative blade section, means for supporting the blade, means for supporting a plurality of tools in operative relation to the blade, means for projecting a plurality of longitudinally spaced cross-sectional contours of the blade, said tools including a pair of tools spaced apart from each other in a direction substantially at right angles to the longitudinal axis of the blade, means for moving one of said supporting means relative to the other for positioning the tools in predetermined relation to the contours of the blade as determined by the projected images, said last means including means for turning said one of said supporting means angularly about an axis substantially coincident with the longitudinal axis of the blade for positioning said pair of tools and the trailing edge of the blade in predetermined angular relation to each other and other means for moving one of said supporting means linearly in two directions substantially parallel to the contours and substantially at right angles with respect to each other, and means for moving the tools into engagement with the blade when the tools and blade are in predetermined relation.

17. In a device for forming locating points on a compressor or turbine blade having a root section and an operative blade section, means for supporting the blade, means for supporting a plurality of tools in operative relation to the blade, means for projecting a plurality of longitudinally spaced cross-sectional contours of the blade, means for computing the area of the projected images and the center of gravity of each of the projected images, and means for moving one of said supporting means to position the tools in predetermined relation to the contours of the work piece by reference to an imaginary line passing through the computed centers of gravity of the projected contours, said moving means including means for moving one of said supporting means in two directions substantially at right angles to each other in a plane substantially parallel to the plane of the cross-sectional contours.

18. In a device for forming locating points on a compressor or turbine blade having a root portion and an operative blade portion extending from one surface of the root portion, said locating points providing for subsequent positioning of the blades during machining operations thereon, said device including supporting means engageable with the blade root portion for holding the blade, means for supporting a plurality of tools in operative relation to the blade root portion, said tools including a pair of tools closely spaced apart in a direction substantially at right angles to the longitudinal axis of the blade, means for projecting a plurality of longitudinally spaced cross-sectional contours of the operative blade portion, means for moving said one of said supporting means with respect to the other for positioning the tools in predetermined relation to the contours of the blade as determined by the projected contours, said last means including means for moving said one of said supporting means translationally in two directions substantially at right angles to each other and substantially at right angles to the longitudinal axis of the blade, and other means for moving said one of said supporting means angularly about an axis substantially coincident with the longitudinal axis of the blade for positioning said pair of tools in predetermined relation to the trailing edge of the blade, and means for moving the tools into contact with the blade after the tools and blade are in the predetermined relation to each other.

19. In a device for forming locating points on a compressor or turbine blade having a root portion and an operative blade portion extending from one surface of the root portion, said locating points providing for subsequent positioning of the blades during machining operations thereon, said device including supporting means engageable with the blade root portion for holding the blade, means for supporting a plurality of tools in operative relation to the blade root portion, said tools including a pair of tools closely spaced apart in a direction substantially at right angles to the longitudinal axis of the blade, means for projecting a plurality of longitudinally spaced cross-sectional contours of the operative blade portion, means for moving said blade supporting means translationally in two directions substantially at right angles to each other and substantially at right angles to the longitudinal axis of the blade, and other means for moving said blade supporting means angularly about an axis substantially coincident with the longitudinal axis of the blade, and other means for moving said blade supporting means about an axis at right angles to the longitudinal axis of the blade for positioning said blade in predetermined relation to the tools, and means for moving said tools into contact with the blade after the tools and blade are in the predetermined relation to each other.

20. In a device for forming locating points on a compressor or turbine blade having a root portion and an operative blade portion extending from one surface of the root portion, said locating points providing for subsequent positioning of the blades during machining operations thereon, said device including supporting means engageable with the blade root portion for holding the blade, means for supporting a plurality of tools in operative relation to the blade root portion, said tools including a pair of tools closely spaced apart in a direction substantially at right angles to the longitudinal axis of the blade, means for projecting a plurality of longitudinally spaced cross-sectional contours of the operative blade portion, means for moving said blade supporting means translationally in two directions substantially at right angles to each other and substantially at right angles to the longitudinal axis of the blade, and other means for moving said blade supporting means angularly about an axis substantially coincident with the longitudinal axis of the blade, and other means for moving said blade supporting means angularly about each of two axes substantially at right angles to each other and substantially at right angles to the longitudinal axis of the blade for positioning the blade in predetermined relation to the tools, and means for moving the tools into contact with the blade after the tools and blade are in the predetermined relation to each other.

21. In a device for forming locating points on a compressor or turbine blade having a root section and an operative blade section, means for supporting the blade, means for supporting a plurality of tools in operative relation to the blade, means for projecting a plurality of longitudinally spaced cross-sectional contours of the blade, means for computing the center of gravity of the projected images and for determining the angle of the trailing edge of the blade with respect to a plane in space, said tools including a pair of tools spaced apart from each other in a direction substantially at right angles to the longitudinal axis of the blade, means for moving one of said supporting means relative to the other for positioning the tools in predetermined relation to the contours of the blade as determined by the computed centers of gravity of the projected images and by reference to the angle of the trailing edge of the blade, said last means including means for turning said one of said supporting means angularly about an axis substantially coincident with the longitudinal axis of the blade for positioning said pair of tools and the trailing edge of the blade in predetermined angular relation to each other, and other means for moving one of said supporting means linearly in two directions substantially parallel to the contours and substantially at right angles with respect to each other, and means for moving the tools into engagement with the blade when the tools and blade are in predetermined relation.

VAL CRONSTEDT.

(References on following page)

REFERENCES CITED

The following references are of record in the file of this patent:

UNITED STATES PATENTS

| Number | Name | Date |
|---|---|---|
| 1,546,636 | Engelmann | July 21, 1925 |
| 1,800,209 | Christopherson | Apr. 14, 1931 |
| 1,973,204 | Goss | Sept. 11, 1934 |
| 2,066,996 | Morika | Jan. 5, 1937 |
| 2,069,647 | LaTour | Feb. 2, 1937 |
| 2,109,849 | Price | Mar. 1, 1938 |
| 2,145,116 | Howard | Jan. 24, 1939 |
| 2,163,124 | Jeffreys | June 20, 1939 |
| 2,164,169 | Wolfarth | June 27, 1939 |
| 2,169,159 | Moller | Aug. 8, 1939 |
| 2,192,529 | Thomas | Mar. 5, 1940 |
| 2,326,319 | Bailey | Aug. 10, 1943 |
| 2,335,127 | Ling | Nov. 23, 1943 |
| 2,447,024 | Metcalf | Aug. 17, 1948 |

FOREIGN PATENTS

| Number | Country | Date |
|---|---|---|
| 494,687 | England | Oct. 31, 1938 |